Aug. 12, 1941. G. R. G. GATES 2,252,482
SERVO BRAKE MECHANISM
Filed July 15, 1937   5 Sheets-Sheet 1

INVENTOR
G. R. G. Gates.
BY
Lacey & Lacey, ATTORNEYS

Patented Aug. 12, 1941

2,252,482

UNITED STATES PATENT OFFICE 2,252,482

SERVO BRAKE MECHANISM

Geoffrey Robert Greenbergh Gates, London, England, assignor of one-half to Automotive Products Company Limited, London, England Application July 15, 1937, Serial No. 153,846
In Great Britain July 15, 1936

17 Claims. (Cl. 188—152)

REISSUED

JAN 20 1948

This invention relates to servo brake mechanism of the type in which a servo or booster device is brought into operation by the actuation of a foot pedal or the like, the brake-applying effort being transmitted to the brake hydraulically or mechanically.

My patent, No. 2,096,396, dated October 19, 1937, describes booster brake mechanism of this kind employing a clutch booster having a continuously rotating driving member or members and one or more driven members connected operatively with the brakes and comprising, in combination with the booster clutch, the usual brake pedal and connection for operating the brakes therefrom, and hydraulic mechanism for operating the booster from the brake pedal, the cylinder and ram of which hydraulic mechanism are actuated by movement of the brake pedal to create fluid pressure for operating the booster, this fluid pressure being reduced by the operation of the booster in applying the brakes. The specification describes the arrangements in which the cylinder and ram of the hydraulic mechanism for operating the booster or servo serve not only to produce liquid pressure in said mechanism but also to reduce said pressure upon the operation of the servo. According to the present invention, however, reduction of liquid pressure in a hydraulic system for operating the booster of the brake mechanism is effected by cylinder and piston structure.

One object of the present invention is, therefore, to provide a hydraulic system for operating the booster of a brake mechanism of this type which includes cylinder and piston structure so arranged that the greater the effort applied to the brake pedal the greater the volume of the cylinder and piston structure.

As another object, the invention seeks to provide a brake system employing a master cylinder operated by a foot pedal or the like, the pressure in which acts to bring the booster into operation, the pressure being reduced in the cylinder as the booster comes into action by the increase of volume within an additional piston and cylinder structure connected with the system, the variation of depressed effort on the pedal serving to vary the extent of operation of the booster.

As a still further object, the invention seeks to provide a fluid pressure system employing a booster having a master cylinder operated by a foot pedal, and a plurality of additional or slave cylinders acting to bring the booster into operation as well as an additional cylinder and piston type variable volume device, all of the structure acting to set up a state of balance between the depressed effort on the pedal or the like and the effort exerted by the booster.

Further and incidental objects of the invention not specifically mentioned hereinbefore will become apparent during the course of the following description.

The invention is illustrated in the accompanying drawings, wherein.

Figures 1, 2, 3, 4:
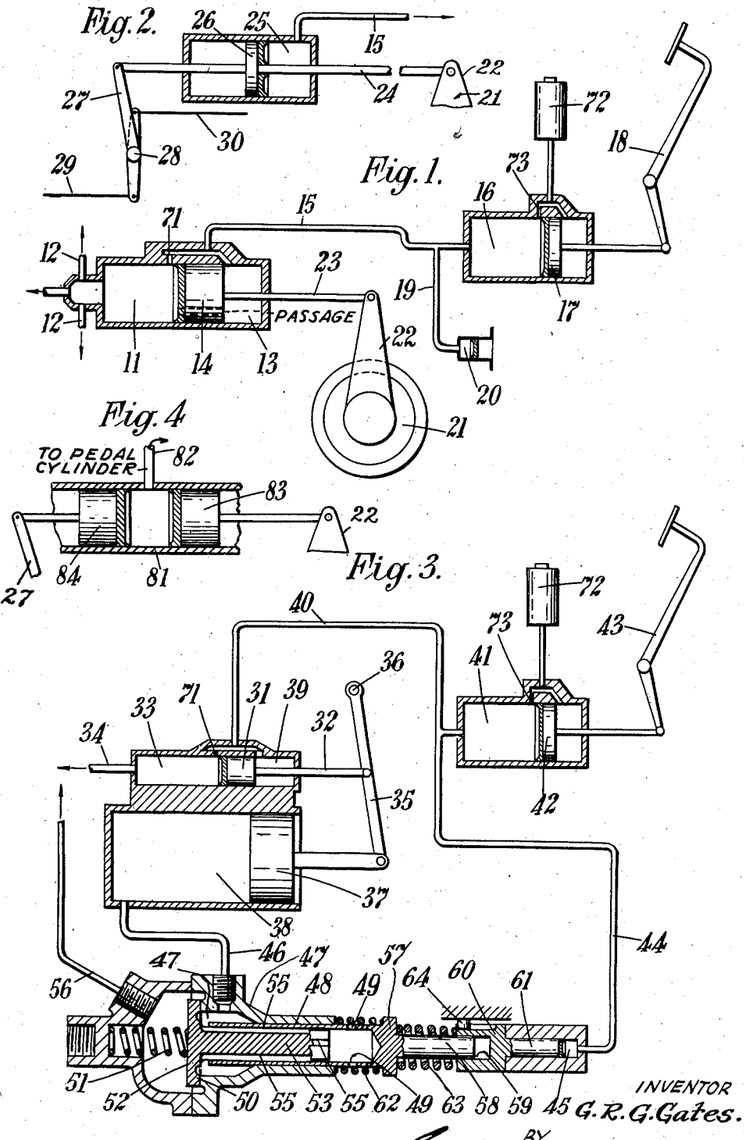
Figure 1 is a diagrammatic view showing a clutch type booster device wherein the brake-applying effort is transmitted hydraulically to the brakes.
Figure 2 is a diagrammatic view showing the same arrangement applied to a system wherein the brake-applying effort is transmitted mechanically to the brakes.
Figure 3 is a diagrammatic view showing an arrangement having a vacuum type booster and a valve controlling the connection thereof with a source of reduced pressure, the valve and booster being shown in section.
Figure 4 is a sectional view of a cylinder containing both a variable volume piston and a slave piston.

Referring now more particularly to the drawings wherein similar reference numerals will be seen to designate like parts throughout the various views, reference is had particularly to Figure 1 wherein a master cylinder producing a hydraulic pressure by which braking pressure is transmitted to the brakes, is indicated generally at 11, and the connections thereto of the brake leads or conduits at 12. In this example, a closed space 13 is provided behind the master piston 14 and is utilized as an additional variable volume device.

As will be seen, the space 13 is connected by a pipe 15 with a pedal master cylinder 16, which includes a piston 17 therein which piston is adapted to be connected with a brake pedal 18 for movement thereby. The cylinder 16 is connected, also, by a pipe 19 to a slave cylinder 20 which will be effective for operating the booster clutch device shown generally at 21. It should be understood that, if desired, more than one slave cylinder may be employed. The driven member or members of the booster clutch 21 are connected to an arm 22 which is connected by means of a rod 23 with the master piston 14.

As will be understood, when the brake pedal 18 is depressed, pressure is created in the pedal cylinder 16, in the pipes 15 and 19, in the space 13, and in the slave cylinder 20, with the result that the servo or booster device 21 is caused to shift the master piston 14 to create pressure in the cylinder 11 for increasing the volume of the space 13 and reducing the pressure in the cylinder 16 whereby operation of the booster is maintained. As will be seen, there is established a balance between the pressure within the master cylinder 11 i. e., the actual brake-applying effort on the one hand and the pressure in the pedal cylinder 16 on the other hand so that the booster 21 will always be under control of the driver by way of the pedal 18. Attention is directed to the fact that even in the event of failure of the booster 21, the brakes can still be applied by the brake pedal without the assistance of the booster for the reason that, if the booster is inoperative, the pressure in the cylinder 16 will be transmitted to the master cylinder 11 by way of the space 13 and the master piston 14. In this event, the piston 14 may be shifted by the pressure of liquid in the space 13. If desired, liquid may be caused to flow from the space 13 to the master cylinder by way of the usual bores or passages, which it has not been deemed necessary to illustrate, in the piston 14 and past the cup washer at the working face of the piston 14.

Referring now to Figure 2 of the drawings, wherein braking mechanism in which the braking effort is transmitted mechanically to the brakes, as shown, there is connected with the arm 22 of the booster 21, instead of the rod 23, a rod 24 which extends through a cylinder 25 and has secured thereon a piston 26, the rod 24 extending past the piston and through the cylinder and having secured at the end thereof a lever 27 which has its opposite end connected with a cross shaft 28, which cross shaft is connected mechanically with the brakes by means of tie cables 29 and 30. In this embodiment of the invention, the conduit 15 will be connected with the cylinder 25 instead of with the space 13 behind the master piston. It will be understood that the cylinder 25 is equivalent in every respect to the space 13 of Figure 1, the only difference in operation between the two arrangements being that, in one case, the applying pressure is transmitted hydraulically and in the other case mechanically to the brakes.

Referring now to Figure 3 of the drawings, a piston 31 has a thrust rod 32 extending therefrom. The piston 31 constitutes the master piston of a master cylinder 33 which is connected by a pipe 34 with the brakes. The rod 32 is connected, at its outer end, with a lever 35 which is pivoted at 36 and which is connected at its lower end with a piston 37 which operates in the cylinder 38. The piston 37 and cylinder 38 constitute a vacuum type booster device and, as will be seen, reduction of pressure in the cylinder 38 will cause shifting of the piston 37 and rocking of the lever 35 for imparting effort to the piston 31. The space behind the piston 31 is enclosed to define a variable volume cylinder 39 which is connected by suitable passages and a pipe 40 with a pedal cylinder 41. The piston 42 within the pedal cylinder is connected with a brake pedal 43 and is actuated thereby. The pedal cylinder also may be connected by a pipe 44 with a single slave cylinder 45. As will be seen, the cylinder 38 is normally open to the atmosphere by virtue of the pipe 46, the interior of the valve 47 and included valve structure. The valve chest or interior 47 is formed with a valve seat 50 which normally cooperates, by means of a spring 51, with a valve 52 having an integral stem 53 slidable within the sleeve 48 of the valve. The stem is formed with a plurality of slots 55 which afford communication for air through ports 49 and the interior of the sleeve 48. A blank 56 communicates between the valve chest 47 and a source of reduced pressure such as the intake manifold of an internal combustion engine. The sleeve 48 is formed with an integral flange 57 and with a stem 58 extending coaxially therefrom into a recess 59 in an enlarged head 60 of a piston 61 of the slave cylinder 45. A spring 62 surrounds the sleeve 48 between the flange 57 thereof and the adjacent end of the valve chest 47. A further compression spring 63 surrounds the stem 58 between the flange 57 and the adjacent end of the head 60 of the piston or plunger 61.

It will be seen that, when the pedal 43 is depressed, the pressure in the slave cylinder 45 shifts the plunger or piston 61, thus compressing the spring 63 until the spring 62 is flexed, when the sleeve 48 will be shifted inwardly until it abuts against the valve 52, thus cutting off the cylinder 38 from the atmosphere. As the movement of the sleeve continues, the valve 52 is displaced from the valve seat 50 for placing the cylinder 38 in communication with the pipe 56 and thus with the source of reduced pressure. The result is that the booster piston 37 is rendered operative and motion is transmitted to the piston 31 for creating pressure within the cylinder 33 and applying the brakes. It should be noted that the more the booster acts in the application of the brakes, the more the volume of the space 39 behind the piston 31 is increased. A given increase in the volume of the space 39 will allow the spring 62 to overcome the spring 63 and close the valve 52 for limiting the application of the brakes. The spring 51 is just sufficiently strong to maintain the valve 52 in engagement with the valve seat 50 against the pressure at that side of the valve which is open to the atmosphere. In the event that the booster fails, a stop 64 limits movement of the piston 61 so that pressure from the pedal cylinder 41 may be transmitted to the brakes by the piston 31.

Attention is directed to the fact that both of the master cylinders 11 and 33 in Figures 1 and 3, respectively, have recuperation passages 71 which are effective for allowing any excess or deficiency of fluid to be compensated from an external tank 72 at which time the moving parts are located in their inoperative positions. The passages 71 are in permanent communication with the pedal cylinders 16 and 41, which also have recuperation passages 73 so that the reservoir or tank 72 will serve for both the hydraulic systems. Therefore, in each case, the booster controlling hydraulic system will be replenished directly from the reservoir or tank 72 and the brake-applying hydraulic system will be replenished from the booster controlling system. Any excess fluid in the brake system will spill to the booster system and from the booster system into the tank 72.

In all the arrangements so far described, the reduction of pressure in the system as the servo operates is effected by the change of volume of what is in fact a separate variable volume device connected with the system, although, in the case of Figures 1 and 3, the variation of volume is effected directly by the movement of the master piston whereby braking effort is transmitted hydraulically to the brakes. It is not necessary, however, that such a separate variable volume device should be employed, for instead one or more slave cylinders may be utilized to effect the reduction of pressure.

As shown in Figure 4 of the drawings, I employ a cylinder 81 which is connected by a pipe 82 with a pedal cylinder, such as the cylinder 16 or 41. The cylinder 81 contains two opposed pistons 83 and 84. The piston 83 is a slave piston and is connected operatively by suitable means with the booster or with a valve controlling the operation thereof. The piston 84 is operative for controlling the volume between the pistons 83 and 84 and is mechanically connected to move with the booster and may, for example, be equivalent to the piston 26 of Figure 2 or the piston 14 of Figure 1. Thus, in operation, depression of the pedal to operate the pedal cylinder 16 supplies pressure liquid to the space between the two pistons 83 and 84. Movement of the piston 83 will, of course, cause movement of the liquid in the cylinder, and said liquid to be compressed for moving the piston 84. The lever 27 will thus be shifted.

Figure 5:
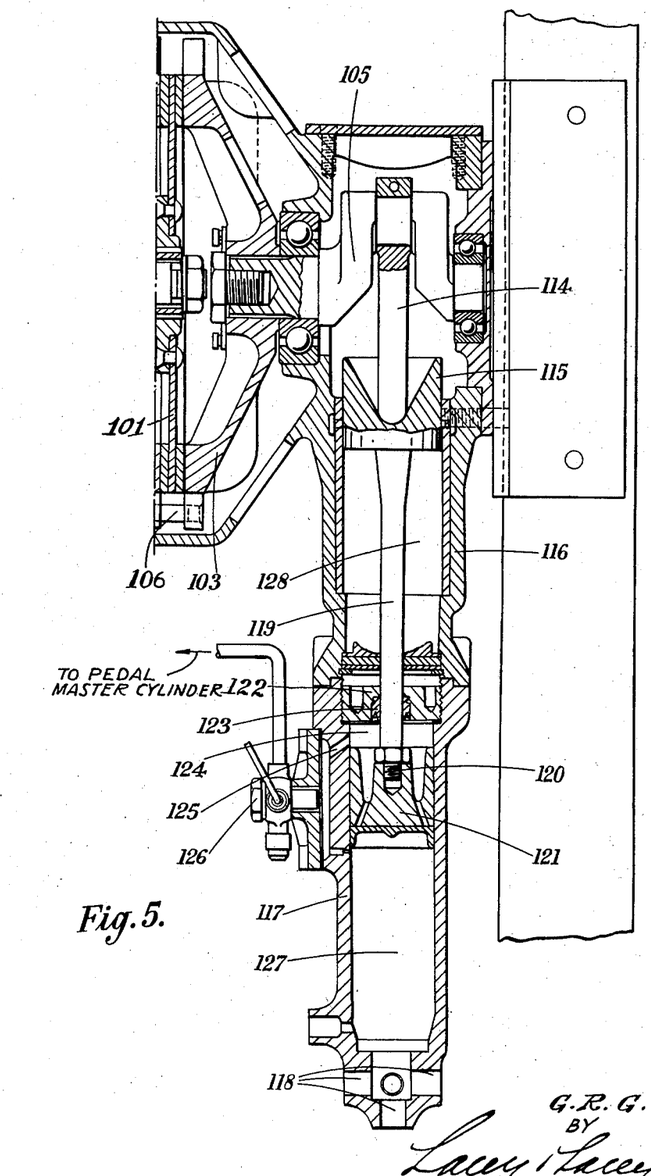
Figure 5 is a sectional view, partly in elevation showing a practical booster device as it will appear operatively connected with brake-applying means, the brake pedal or other manual control, the hydraulic pressure-creating means and the hydraulic connections being omitted.
Figure 5A:
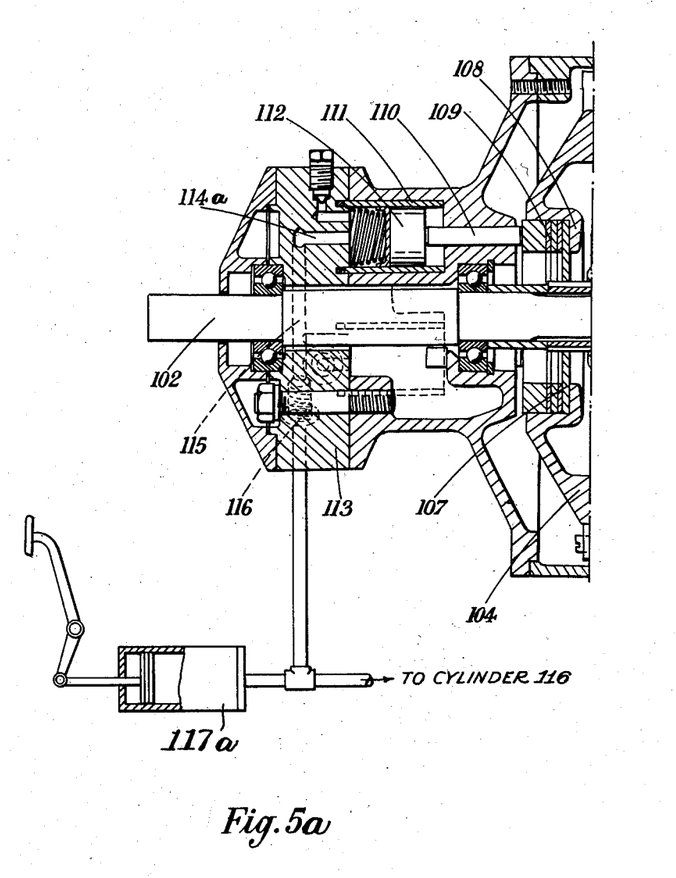
Figure 5a is a fragmentary sectional view disclosing the mounting for the slave cylinders and their associated parts.

Referring now to Figure 5 of the drawings, I have illustrated a clutch type booster or servo similar to that described in Patent No. 2,096,393. The clutch or booster or servo, as shown in Figure 5, includes a single driving plate 101 splined with a shaft 102 which is driven continuously from the conventional transmission of the vehicle preferably so that it rotates with the road wheels of said transmission. The driving plate 101 is positioned between two driven plates 103 and 104, the plate 103 being fixed on the crank shaft 105 and the plate 104 being rotatable relative to the shaft 102 and slidable in relation thereto and to the plate 103 with which it is caused to rotate by means of pins 106 which extend from the plate 103 through openings in the plate 104. The plate 104 is centered about the shaft 102 by a disc 107 located in a recessed part 108 of the plate 104 together with a thrust bearing, indicated at 109, with which cooperate a number of thrust rods, one of which is indicated at 110. Each of these thrust rods 110 extends into a corresponding slave cylinder, one of which is indicated at 111, to cooperate with the piston 112 therein, the casing 113 of the mechanism being formed with internal bores, indicated at 114a and 115a, communicating with an inlet 116a which is connected with a suitable pedal master cylinder 117a.

It will be understood that, when the clutch is engaged, the movement imparted to the driven plates 103 and 104 will rotate the crank shaft 105. The crank shaft 105 has a thrust rod 114 which cooperates with a recessed guide block 115 slidable in a cylinder 116. The cylinder 116 has mounted thereon an axially disposed master cylinder 117 for creating liquid pressure in the hydraulic transmission of the braking effort to the brakes, the usual brake pipes being connected with the master cylinder 117 at the ports 118. The guide block 115 has extending therefrom an integral thrust rod 119 secured, as indicated at 120, to the piston 121 of the master cylinder 117. This rod 119 extends through a partition 122 and a gland 123 enclosing a space 124 at the rear of the master piston 121. The space 124 is connected through the port 125 and union 126 with the pedal master cylinder 117a.

It will be seen that angular movement of the crank shaft 105 in either direction as the result of the engagement of the clutch will result in movement of the piston 121 to create brake-applying pressure in the master cylinder 117 and, at the same time, to increase the volume of the space 124 behind the piston 121, thus reducing the pressure in the slave cylinder 111 by which the clutch is engaged. At the termination of braking the piston 121, the guide block 115 and the crank shaft 105 are returned to the normal positions shown by the usual return springs 127 in the master cylinder 117 and by a spring 128 surrounding the rod 119.

Figure 6:
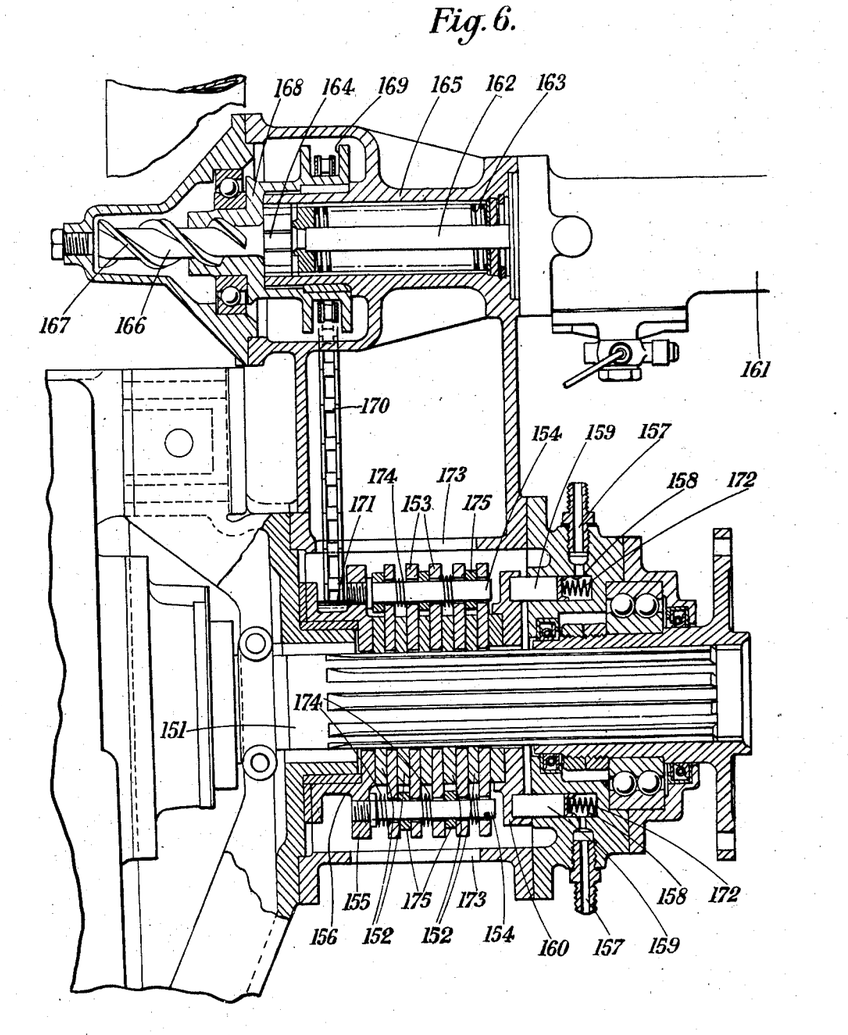
Figure 6 is a horizontal sectional view, partly in elevation, showing a modified arrangement of booster.

Referring now to Figure 6 of the drawings, another embodiment of the booster is shown. This arrangement is, essentially, similar to that shown in Figure 5. In this embodiment, however, a shaft 151, which is driven continuously from the transmission of the vehicle and which is preferably the propeller shaft, is surrounded by a multiple clutch having driving plates 152 which are splined on the shaft 151 and the driven plates 153 which are of larger diameter and are keyed together by pins 154 extending from a driven member or flange 155 which defines an annular groove or channel 156. The clutch of this embodiment of the invention is engaged by the introduction of liquid under pressure from a suitable pedal master cylinder, such as the master cylinder hereinbefore described, by way of ports 157 to a plurality of slave cylinders, two of which are shown at 158, which contain pistons 159 cooperating with a thrust member 160. The master cylinder 161 in this instance is disposed parallel with the axes of the clutch 152, 153 and has a thrust rod 162 extending from the rear face of the piston thereof through a partition and gland which are similar to the piston and gland 122 and 123, respectively, of the arrangement shown in Figure 5; this rod 162 being surrounded by a return spring 163. At the end remote from the master cylinder 161, the rod 162 cooperates with a member 164 in splined relationship with a cylinder 165 through which the rod 162 extends and which carries the master cylinder 161. The member 164 has a portion 166 which is formed with a quick pitch screw thread 167. A rotatably mounted axially fixed nut 168 cooperates with the thread part 166 of the member 164, and this nut is formed with an annular groove or channel 169. A roller chain, shown in dotted lines at 170, serves to transmit motion from the driven clutch member 155 to the nut 168, the chain being anchored at one end to a pin 171 which extends across the groove 156 in the driven member 155 and is similarly anchored at its other end to the nut 168.

The chain 170 is so disposed relative to the clutch member 155 and to the nut 168 that movement of the driven member in either direction will rotate the nut 168 and, therefore, shift the member 164 to the right, as shown in the drawings. Thus, by means of the rod 162, the master piston will be shifted to create brake-applying effort or pressure. After braking, the nut 168 is returned to the normal position shown by the usual return springs in the master cylinder 166 and by the spring 163. In this case, however, the driven clutch member 155 is returned to its normal position by a slight drag on the clutch 152, 153 to produce which drag I provide springs 172 in the slave cylinders 158. This drag in the clutch 152, 153 takes up lost motion in the connection between the driven member 155 and the nut 168, and insures that the master piston shall be shifted immediately upon actuation of the brake pedal or other control member.

In view of the fact that large diameter driven clutch members 153 are provided, such members serve efficiently as cooling fins. In order to assist in cooling, the casing of the device is cut-away, as indicated at 173, where it surrounds the clutch.

The rods 154 have threaded thereover, alternately, coiled compression springs 174 and bushings 175 so disposed that, between each adjacent pair of clutch plates 153, each rigid bushing 175 is diametrically opposed to a spring 174. The clutch plates will thus be prevented from vibrating. Attention is called to the fact that only two diametrically opposed rods 154 may be provided with clutch springs 174 and bushings 175, as illustrated.

Figures 7, 8:
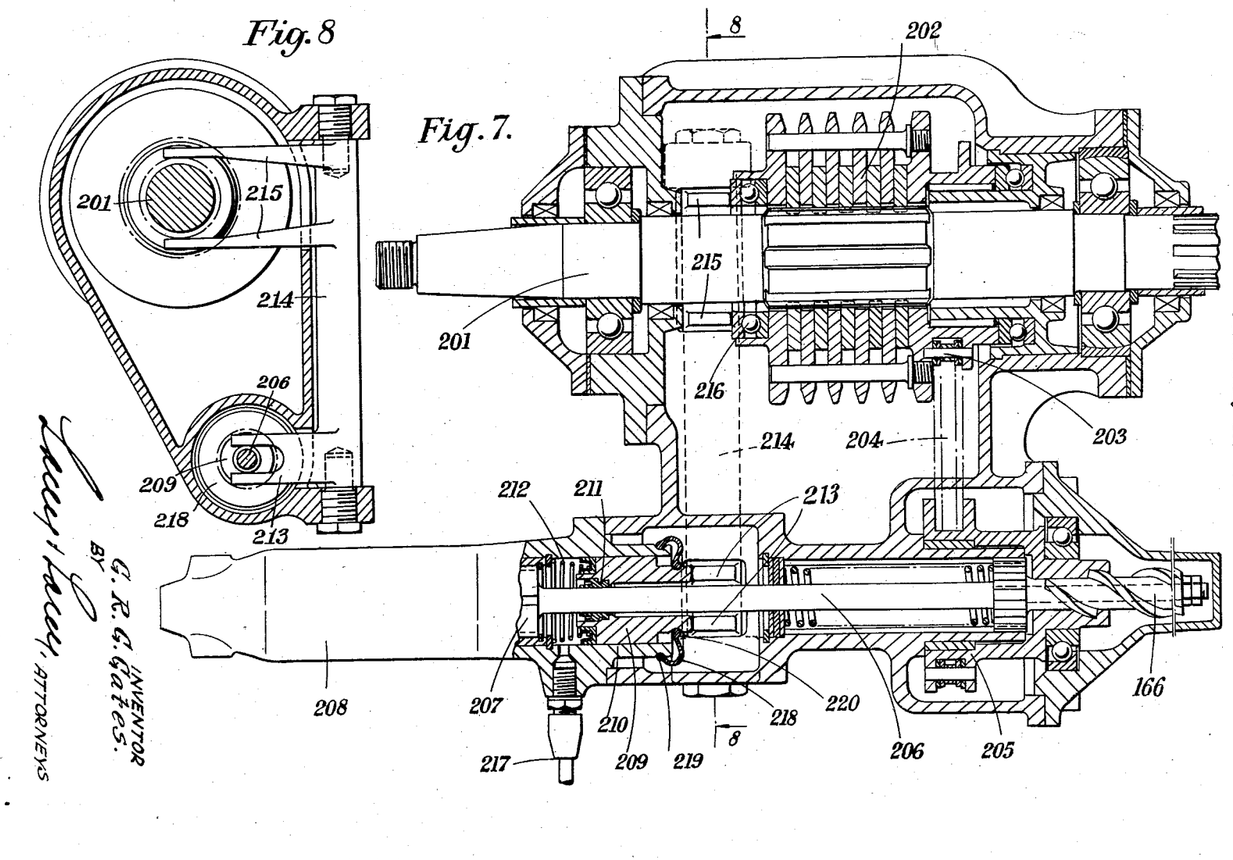
Figure 7 is a longitudinal sectional view showing a still further modified booster structure.
Figure 8 is a vertical sectional view on the line 8—8 of Figure 7 looking in the direction indicated by the arrows.

The embodiment of the invention as shown in Figures 7 and 8 of the drawings is quite similar to that shown in Figure 6. In this embodiment, however, a single cylinder and piston device operate as a slave cylinder and to effect reduction of pressure in the system with booster operation. A shaft 201, which may be the propeller shaft of the vehicle, carries a clutch 202 which is similar in construction to that shown in Figure 6 and has a driven member 203 connected by a roller chain 204 with an axially fixed nut 205 for imparting pressure through a thrust rod 206 to a master piston 207 for effecting in a master cylinder 208 the necessary pressure for brake application. The rod 206 extends through an annular piston 209 slidable in a rearward extension 210 of the master cylinder 208, a gland or packing 211 being provided to maintain a liquid tight space 212 between the pistons 207 and 209. A fork 213 cooperates with the rear face of the piston 209 and said fork is integrally formed with a cross shaft 214. The cross shaft 214 has formed integrally thereon an additional fork formed with arms 215 which cooperate with a thrust bearing 216, the thrust bearing engaging and operating the clutch 202.

The space 212, between the pistons 207 and 209, is connected by a pipe 217 with a pedal cylinder similar to that shown and described hereinbefore, and it will be seen that pressure in the space 212 will shift the piston 209 for rocking the shaft 214 and transmitting pressure to the bearing 216 for engaging the clutch 202. The operation of the clutch shifts the piston 207 for reducing the pressure in the space 212 and thus reducing the pressure applied to the bearing 216. When the pressure from the pedal cylinder is released, the piston 209 is caused to assume a normal position by the action of a resilient washer 218 which is engaged in a circumferential groove 219 in the rearward extension 210 of the master cylinder 208. At its inner periphery, the washer engages in a circumferential groove 220 formed in the rear portion of the piston 209.

It will be readily understood that the booster arrangements shown in Figures 5 to 8 of the drawings are applicable in cases where the brake-applying effort is to be applied mechanically instead of hydraulically to the brakes. For example, in Figure 5, the rod 119 may extend through and beyond the piston 121 to be connected with the mechanical brake mechanism.

It is thought that the construction and operation of my improved system will now be clearly understood.

Having thus described the invention, what is claimed as new is:

1. In a system of the class described, a pedal cylinder, a foot pedal operatively connected therewith, a booster, a slave cylinder operatively connected with the booster effecting operation of the booster upon depression of the foot pedal, and an additional cylinder and piston device adapted to have the volume thereof increased by operation of the booster, the liquid required to fill the increased volume being withdrawn from the system, thus reducing pressure in the system and balancing the depressive effort on the pedal with the effort exerted by the booster.

2. In a hydraulic fluid pressure system, a master cylinder, a piston, a booster, means operatively connecting the booster with the piston, brakes, a rod connected with the brakes and extending concentrically into the master cylinder for connection with the piston therein whereby said brakes will be mechanically connected to the cylinder and piston, the volume of the cylinder being increased at one side of the piston as the brakes are applied by operation of the booster and said piston.

3. In a hydraulic system of the class described, in combination with vehicle brakes, a brake pedal, a cylinder operatively connected with the brake pedal and having a recuperation passage, a reservoir, means operatively connecting the reservoir with the pedal cylinder through said recuperation passage, a master cylinder having a recuperation passage, means operatively connecting the master cylinder recuperation passage with the pedal cylinder, a booster, and means operatively connecting the booster with the master cylinder, said reservoir serving to replenish both of the cylinders, the pedal cylinder being replenished directly from the reservoir and the master cylinder being replenished from the pedal cylinder, excess fluid from the master cylinder being adapted to flow through the pedal cylinder back to the reservoir.

4. In a hydraulic system of the class described, in combination with vehicle brakes, a pedal, a hydraulic cylinder unit operated thereby, a variable volume device connected hydraulically with the pedal cylinder, a motor cylinder unit also connected hydraulically with the pedal cylinder, a booster controlled by the motor cylinder unit and operatively connected with the brakes, said booster being of the clutch type and having a crank and driving and driven members, a thrust rod shiftable by the crank, said crank being adapted to turn with the driven members, a connecting rod connected with said thrust rod and being adapted to be moved by the connecting rod in the same direction when the crank is moved, a master cylinder having a piston, said piston being fixed on the thrust rod, said rod and piston moving for transmitting hydraulic brake-applying effort to the brakes while operation of the booster causes the variable volume device to become enlarged, thereby tending to reduce the liquid pressure in the motor cylinder unit.

5. In a system of the class described, a foot pedal, a pedal cylinder operatively connected therewith, a booster, and a variable volume device, pressure created in the pedal cylinder upon depression of the foot pedal operating the booster for operating the vehicle brakes connected with said variable volume device and booster, said variable volume device being operable for reducing the pressure in the system and operating the booster in accordance with depressive effort on the foot pedal, the volume of the variable volume device being increased progressively with decreasing volume in the system and consequent increased effectiveness of the booster.

6. A system for operating booster brake mechanism including a foot pedal, a liquid pressure generator operated by said foot pedal, a master cylinder, a booster, a piston in the master cylinder operated by the booster for supplying hydraulic pressure to the brakes for operating said brakes, said master cylinder being enclosed behind the piston for defining a variable volume device, a motor piston in said variable volume device, and a mechanical connection between the motor piston and the booster, the liquid pressure generator being adapted to supply pressure liquid to said variable device to move said motor piston and operate the booster.

7. A system for operating booster brake mechanism including a foot pedal, means connected with the foot pedal for creating liquid pressure in the system upon the depression of the pedal, a motor device fed with the pressure liquid to apply the booster, and a variable volume device hydraulically connected with the pressure creating means and the motor device and actuated by the booster so that as the latter comes into operation the volume of the variable volume device increases, the liquid required to fill the increased volume being withdrawn from the system, thereby reducing the liquid pressure in the motor unit.

8. A system for operating booster brake mechanism including a foot pedal, means connected with the foot pedal for creating liquid pressure in the system upon depression of the pedal, a motor cylinder fed with said pressure liquid, a motor piston in said cylinder arranged to actuate the booster, and an auxiliary piston which is also in said cylinder and is connected operatively with the booster so as to be moved by the latter in a direction away from the motor piston as the said booster comes into action, thereby tending to reduce the liquid pressure acting upon the motor piston.

9. A system for operating booster brake mechanism including a foot pedal, means connected with the foot pedal for creating liquid pressure in the system upon depression of the pedal, a motor device fed with pressure liquid to apply the booster, and a variable volume device which comprises a cylinder and piston unit hydraulically connected with the pressure creating means and with the motor device, said variable volume device being actuated mechanically by the booster so that as the latter comes into operation, the volume of the variable volume device increases, the liquid required to fill the increased volume being withdrawn from the system, thereby reducing the liquid pressure in the motor unit.

10. A system for operating booster brake mechanism comprising a foot pedal, a hydraulic cylinder and piston unit actuated by said pedal, a motor cylinder unit connected with the pedal cylinder and arranged to actuate the booster when fed with pressure liquid from the pedal cylinder unit, and a variable volume device comprising a cylinder separate from but hydraulically connected with the pedal cylinder unit and the motor cylinder unit, and a piston in said cylinder, said piston being mechanically actuated by the booster so as to increase the working space of the variable volume chamber, the liquid required to fill the increased volume being withdrawn from the system, thereby reducing the liquid pressure acting in the motor cylinder unit.

11. A system for operating booster brake mechanism comprising a foot pedal, a piston and cylinder unit operated thereby, a motor cylinder fed with pressure liquid from the pedal cylinder and arranged to bring the booster into operation, a hydraulic master cylinder unit operated by the booster for applying a set of hydraulic brakes, said master cylinder including a variable volume device comprising a cylinder which is connected hydraulically with the pedal cylinder and the motor cylinder, and a piston which is mechanically connected with the booster so as to enlarge the working space within the cylinder as the master cylinder unit is operated.

12. A system for operating booster brake mechanism comprising a foot pedal, a piston and cylinder unit operated thereby, a motor cylinder fed with pressure liquid from the pedal cylinder and arranged to bring the booster into operation, a hydraulic master cylinder unit including a piston operated by the booster for applying a set of hydraulic brakes, said master cylinder unit incorporating, behind the said piston, a closed variable volume space which is connected with the pedal cylinder unit and the motor cylinder whereby advancing movement of the piston causes the variable volume space to be enlarged thus tending to reduce the liquid pressure in the motor cylinder.

13. A system for operating booster brake mechanism comprising a foot pedal, a piston and cylinder unit operated thereby, a motor cylinder fed with pressure liquid from the pedal cylinder and arranged to bring the booster into operation, a hydraulic master cylinder unit operated by the booster for applying a set of hydraulic brakes, a common reservoir feeding the pedal cylinder unit and the master cylinder unit with working liquid, and a variable volume device incorporated in said hydraulic master cylinder unit and comprising a cylinder which is connected hydraulically with the pedal cylinder and the motor cylinder, and a piston which is mechanically connected with the booster so as to enlarge the working space within the cylinder as the master cylinder unit is operated.

14. A system for operating booster brake mechanism comprising a brake pedal, a cylinder operatively connected with the brake pedal and having a recuperation passage, a reservoir, means operatively connecting the reservoir with the pedal cylinder through said recuperation passage, a master cylinder having a recuperation passage, means operatively connecting the master cylinder recuperation passage with the pedal cylinder whereby said reservoir serves to replenish both of the cylinders, a booster, a motor unit fed with pressure liquid from the master cylinder to bring the booster into action, means operatively connecting the booster with the master cylinder, and a variable volume space which is disposed behind the piston in the master cylinder and is caused to increase in volume as the booster comes into action, thereby tending to reduce the liquid pressure in the motor unit.

15. A system for operating booster brake mechanism including a foot pedal, means connected with the foot pedal for creating liquid pressure in the system upon the depression of the pedal, a booster of the friction clutch type arranged to be operated from a rotating member such as a shaft, a motor device fed with pressure liquid from the pedal-operated means to apply the booster, and a variable volume device hydraulically connected with the pressure-creating means and the motor device and actuated by the booster so that as the latter comes into operation the volume of the variable volume device increases, thereby tending to reduce the liquid pressure in the motor unit.

16. A system for operating booster brake mechanism comprising a foot pedal, a piston and cylinder unit operated thereby, a booster of the friction clutch type arranged to derive brake-applying force from a rotating member such as a shaft, a motor cylinder unit adapted to bring the booster into operation, said motor cylinder unit being fed with pressure liquid from the pedal cylinder, a hydraulic master cylinder unit operated by the booster for applying a set of hydraulic brakes, and a variable volume device comprising a cylinder which is connected hydraulically with the pedal cylinder and the motor cylinder and a piston which is mechanically connected with the booster so as to enlarge the working space within the cylinder as the master cylinder unit is operated.

17. A system for operating booster brake mechanism, comprising a foot pedal, a piston and cylinder unit operated thereby, a booster of the friction clutch type arranged to derive brake-applying force from a rotating member such as a shaft, a motor cylinder unit fed with pressure liquid from the pedal cylinder and arranged to bring the booster into operation, a hydraulic master cylinder unit including a piston operated by the booster for applying a set of hydraulic brakes, said master cylinder unit incorporating, behind the said piston, a closed variable volume space which is connected with the pedal cylinder unit and the motor cylinder unit whereby advancing movement of the piston causes the variable volume space to be enlarged, thus tending to reduce the liquid pressure in the motor cylinder.

GEOFFREY ROBERT
GREENBERGH GATES.